(12) United States Patent  (10) Patent No.: US 7,693,549 B2
Gallagher  (45) Date of Patent: Apr. 6, 2010

(54) INTEGRATED SMART CARD AND BATTERY FOR MOBILE DEVICES

(75) Inventor: Niall Seamus Gallagher, Cambridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 751 days.

(21) Appl. No.: 11/429,124

(22) Filed: May 8, 2006

(65) Prior Publication Data

US 2007/0099662 A1    May 3, 2007

(30) Foreign Application Priority Data

Oct. 31, 2005    (EP)    ................................... 05023766

(51) Int. Cl.
    *H04B 1/38* (2006.01)
(52) U.S. Cl. .................. 455/558; 455/572; 455/425
(58) Field of Classification Search ................ 455/558, 455/572, 550.1, 556.1, 557, 573, 90.3, 343.1, 455/425
    See application file for complete search history.

(56) References Cited

U.S. PATENT DOCUMENTS

| | | | | |
|---|---|---|---|---|
| 6,062,887 A * | 5/2000 | Schuster et al. | ............. | 439/218 |
| 6,179,649 B1 * | 1/2001 | An | ............... | 439/500 |
| 6,244,894 B1 * | 6/2001 | Miyashita | .................... | 439/500 |
| 7,418,272 B2 * | 8/2008 | Son | .............. | 455/558 |
| 2002/0086647 A1 * | 7/2002 | Ilvonen | ........................ | 455/90 |
| 2003/0217210 A1 * | 11/2003 | Carau, Sr. | .................... | 710/302 |
| 2005/0197169 A1 * | 9/2005 | Son | .............. | 455/572 |
| 2006/0030361 A1 * | 2/2006 | Sin | .............. | 455/558 |
| 2008/0161051 A1 * | 7/2008 | Schobbert et al. | ........... | 455/558 |

FOREIGN PATENT DOCUMENTS

| | | |
|---|---|---|
| DE | 20 2004 009815 U1 | 10/2004 |
| EP | 1 308 874 A | 5/2003 |
| GB | 2 363 882 A | 1/2002 |
| JP | 2001 266823 A | 9/2001 |
| JP | 2003 272582 A | 9/2003 |
| WO | 0118981 A | 3/2001 |

\* cited by examiner

*Primary Examiner*—Tan Trinh
(74) *Attorney, Agent, or Firm*—Ogilvy Renault LLP

(57) ABSTRACT

An electronic device for a mobile device and a mobile device comprising the electronic device are provided. The electronic device comprises: a battery including: a housing having a top surface, a bottom surface, and two or more side surfaces; one or more battery cells within the housing; and a battery interface positioned on a surface of the housing; and a smart card having a smart card interface positioned on a surface of the housing.

20 Claims, 4 Drawing Sheets

INTEGRATED SMART CARD AND BATTERY FOR MOBILE DEVICES

FIELD OF THE APPLICATION

This application relates to mobile devices, and more specifically to an integrated smart card and battery for mobile devices.

BACKGROUND

As mobile electronic devices decrease in size, the space available within such devices for various components decreases and component sizing becomes more important. Additionally, as the size of the printed circuit board (PCB) in mobile electronic devices decreases with the size of the device itself, the competition for space on the PCB increases as designers and manufacturers attempt to add more components or fit existing components on smaller PCBs. For smart card-based devices, the smart card may be one of the larger components occupying space on the PCB.

BRIEF DESCRIPTION OF THE DRAWINGS

It will be noted that throughout the appended drawings like features are identified by like reference numerals.

DETAILED DESCRIPTION OF THE PREFERRED EMBODIMENTS

Figure 1:
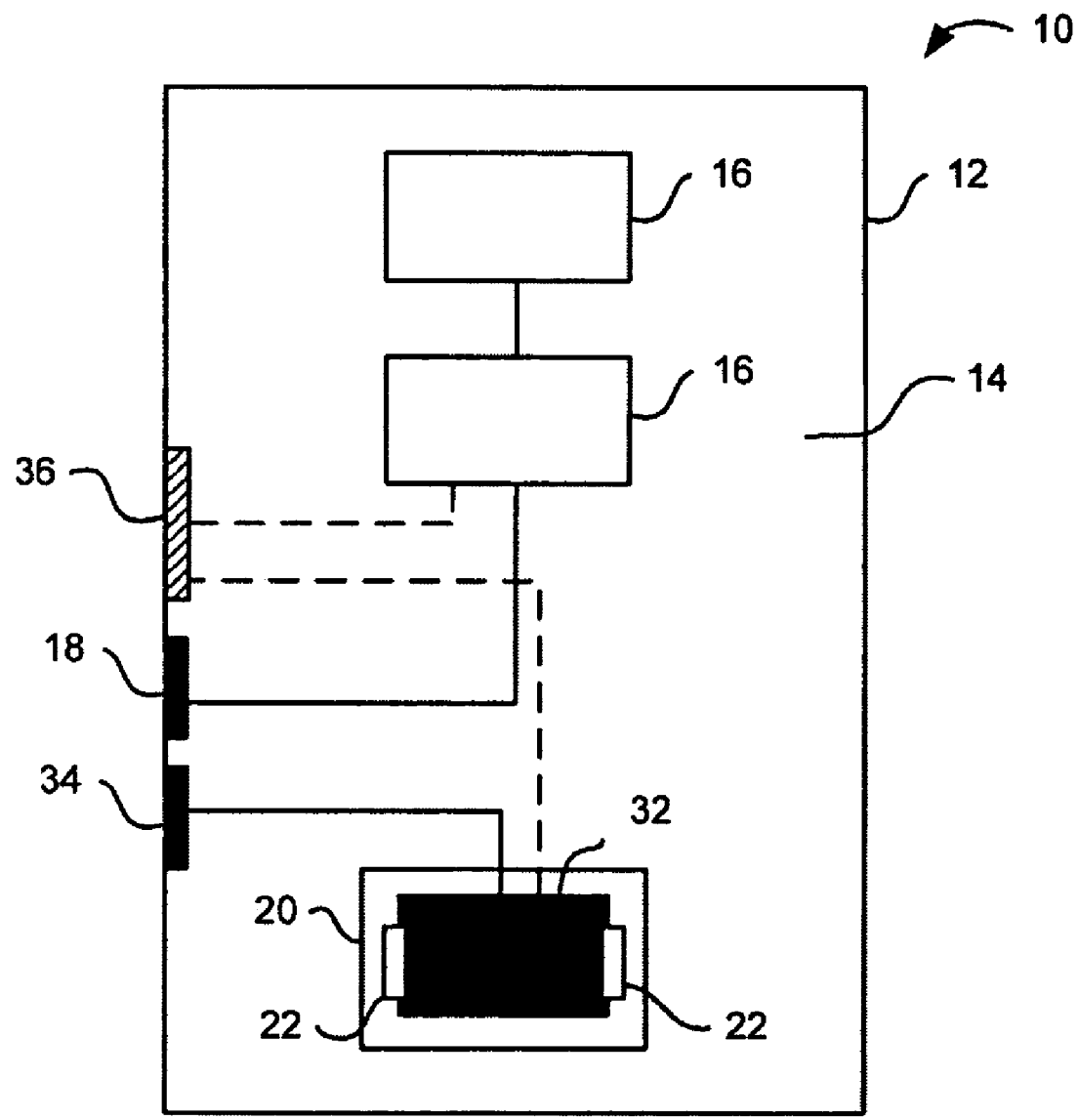
FIG. 1 is a block diagram illustrating an integrated smart card and battery in accordance with one embodiment of the present application.

An electronic device having a battery and smart card for a mobile device, and a mobile device having an integrated smart card and battery device area described. Battery and smart card interfaces are preferably positioned on the sides of the electronic device for connection with the respective interfaces of the mobile device.

In accordance with one aspect of the present application, there is provided an electronic device for a mobile device, comprising: a battery including: a housing having a top surface, a bottom surface, and two or more side surfaces; one or more battery cells within the housing; and a battery interface positioned on a surface of the housing; and a smart card having a smart card interface positioned on a surface of the housing.

The battery interface may be positioned on a side surface of the housing. The smart card interface may be positioned on a side surface of the housing. The smart card interface may be positioned on a side surface of the housing. The smart card interface and battery interface maybe positioned on the same side surface of the housing. The smart card interface and battery interface may be provided in a common data and power connector for providing power and transmitting data between the smart card and the mobile device. The smart card may be received in a recess defined in the top or bottom of the battery housing. The smart card may be releasably engaged within the recess. The smart card may be releasably engaged using a press or snap fit connection. The smart card may configure the mobile device for wireless communications. The smart card may further comprise a Subscriber Identity Module (SIM), a Removable User Identity Module (RUIM) or a Universal Subscriber Identity Module (USIM).

In accordance with another aspect of the present application, a mobile device, comprising: a processor for processing data and instructions; input and output devices operable by a user of the mobile device and operatively connected to the processor; and a casing having the processor and input and output devices received therein, the casing defining a compartment having at least two side surfaces, the compartment having a circuit board operatively connected to the processor and input and output devices received therein and including: a battery interface operatively connected to the circuit board positioned within the compartment for receiving power from a battery to be received within the compartment; and a smart card interface operatively connected to the circuit board positioned within the compartment for communication with a smart card to be received within the compartment.

The battery interface may be positioned on a side surface of the compartment. The smart card interface maybe positioned on a side surface of the compartment. The smart card interface may be positioned on a side surface of the compartment. The smart card interface and battery interface may be positioned on the same, side surface of the compartment.

The mobile device may further comprises: an electronic device received in the compartment, the electronic device comprising: a battery including: a housing having a top surface, a bottom surface, and two or more side surfaces; one or more battery cells within the housing; and a battery interface positioned on a surface of the housing; and a smart card having a smart card interface positioned on a surface of the housing. The respective battery interfaces and respective smart card interfaces of the housing and compartment may be positioned on a common side surface of the housing and compartment, respectively, for providing power and transmitting data between the electronic device and the mobile device. The battery interface and smart card interface of the electronic device and compartment may be provided in a common data and power connector, respectively. The smart card may be received in a recess defined in the top or bottom of the battery housing.

The mobile device may further comprise a communications subsystem, the smart card being adopted to configure the communications subsystem for communication within a wireless communication network.

The mobile device may further comprise a communication subsystem, the smart card comprising a Subscriber Identity Module (SIM), a Removable User Identity Module (RUIM) or a Universal Subscriber Identity Module (USIM) configuring the communications subsystem for communication within a wireless communication network.

In accordance with further aspects of the present application, there is provided an apparatus such as a data processing system, a method for adapting this system, articles of manufacture such as a machine or computer readable medium having program instructions recorded thereon for practicing the method of the application, as well as a computer data signal having program instructions recorded therein for practicing the method of the application.

These and other aspects and features of the application will become apparent to persons of ordinary skill in the art upon review of the following detailed description, taken in combination with the appended drawings.

FIG. 1 is a block diagram of a integrated smart card and battery device 10 in accordance with one exemplary embodiment of the present application. The device 10 comprises: a battery or battery pack 12 comprising a battery housing or casing 14, one or more battery cells 16, and a battery interface 18 (e.g. battery contacts) for connecting the battery pack 12 to a mobile device. The device 10 also comprises a smart card 32 having an interface or contacts 34 for connecting to the mobile device. The smart card interface 34 comprises a communications interface for connection to a corresponding communications interface of a mobile device. The smart card 32 may be any suitable smart card for the mobile device. Smart cards are small electronic devices that have an embedded memory or microprocessor chip. Smart cards have many uses and may be used in variety of electronic devices. For example, smart cards may be used in digital cameras, portable computers, mobile data messaging (e.g. email) and communication devices, two-way pagers, cellular telephones, personal data, assistants (PDAs), wireless handhelds, wireless Internet appliances and other mobile devices and, may be used to provide data storage, data portability, identification, security and convenience.

Exemplary smart cards for use in wireless, communications devices are Subscriber Identity Module (SIM) cards for use in Global System for Mobile communications (GSM) networks, Removable User Identity Module (RUIM) cards for use in CDMA2000 (Code Division Multiple Access 2000) networks, and Universal Subscriber Identity Module (USIM) cards for use in UMTS (Universal Mobile Telephone System) networks.

The battery housing 14 may be molded or otherwise shaped to define a recess 20 for receiving the smart card 32. The recess 20 includes a smart card holder 22 or other means for securing the smart card 32, within the recess 20. The smart card 32 and smart card holder 22 may be any suitable type. The smart card holder 22 is preferably adapted to releaseably engage the smart card 32 so that smart cards (e.g. SIMs) may be removed and replaced as desired or required, for example, according to the requirements of the local wireless communications network (e.g. GSM, CDMA2000 or UMTS). For example, the smart card holder 22, may be configured to provide a snap or press fit connection, and may provide the user with feedback, tactile or otherwise, so that the user knows when the integrated smart card and battery device 10 has been properly installed.

The smart card 32 may be provided in a recess 20 that is external or internal to the battery housing 14. Recessing the smart card 32 within the battery housing 14 may allow the construction of a thinner integrated smart card and battery device 10 depending on the configuration of the battery cells 16, etc. of the battery 12. If the recess 20 is external and the smart card holder 22 is preferably adapted to releasably engage the smart card 32, then the smart card 32 may be removed and replaced. However, when the recess 20 is internal to the battery housing 14 the smart card 32 may be concealed by an external casing of the battery.

Although the smart card 32 is preferably releasably engaged in the smart card holder 22, in other embodiments the smart card 32 may be permanently integrated into the battery housing 14. In such embodiments, the smart card 32 may be secured in a recess 20 that is external or internal to the battery housing 14

Preferably, the smart card interface 34 is provided on a peripheral side of the battery housing 14 and is operatively connected to the smart card 32. Preferably, the battery interface 18 is provided on a peripheral side of the battery housing 14 and is operatively connected to the battery cells 16. The smart card interface 34 and battery interface 18 are preferably provided on the same side of the battery housing 14. The smart card interface 34 and battery interface 18 may be provided in a common, combined or integrated interface or connector 36 that integrates both the battery interface 18 and the smart card interface 34 such that, when the integrated smart card and battery device 10 is inserted into the mobile device, the integrated connector 36 provides an interface for transmitting both power and smart card signals (e.g. data signals) to the printed circuit board of the mobile device. Alternatively, the smart card interface 34 and battery interface 18 may be provided separately on the battery housing 14 using suitable interfaces for connecting the smart card 32 and battery cell 16 to the respective data and power interfaces of the mobile device.

In an alternate embodiment, the smart card interface 34 may be provided on an inwardly facing portion or surface of the battery housing 14 with the smart card holder 22 being in a recess 20 in the battery housing 14. When the integrated smart card and battery device 10 is installed in a mobile device, the smart-card interface 34 is aligned for connection with a corresponding smart card interface on the printed circuit board. Although this embodiment does not provide the same level of space savings as when the smart card interface 34 is provided on a peripheral side of the battery housing 14, it does provide some space savings in that the smart card holder 22 is recessed in the battery housing 14 and eliminated from the inward surface of the device facing the printed circuit board. The space that would have been otherwise taken up by the smart card holder 22 if it were fixed on an external surface can be used for other components or eliminated and used to reduce the overall size of the printed circuit board.

Figure 2:
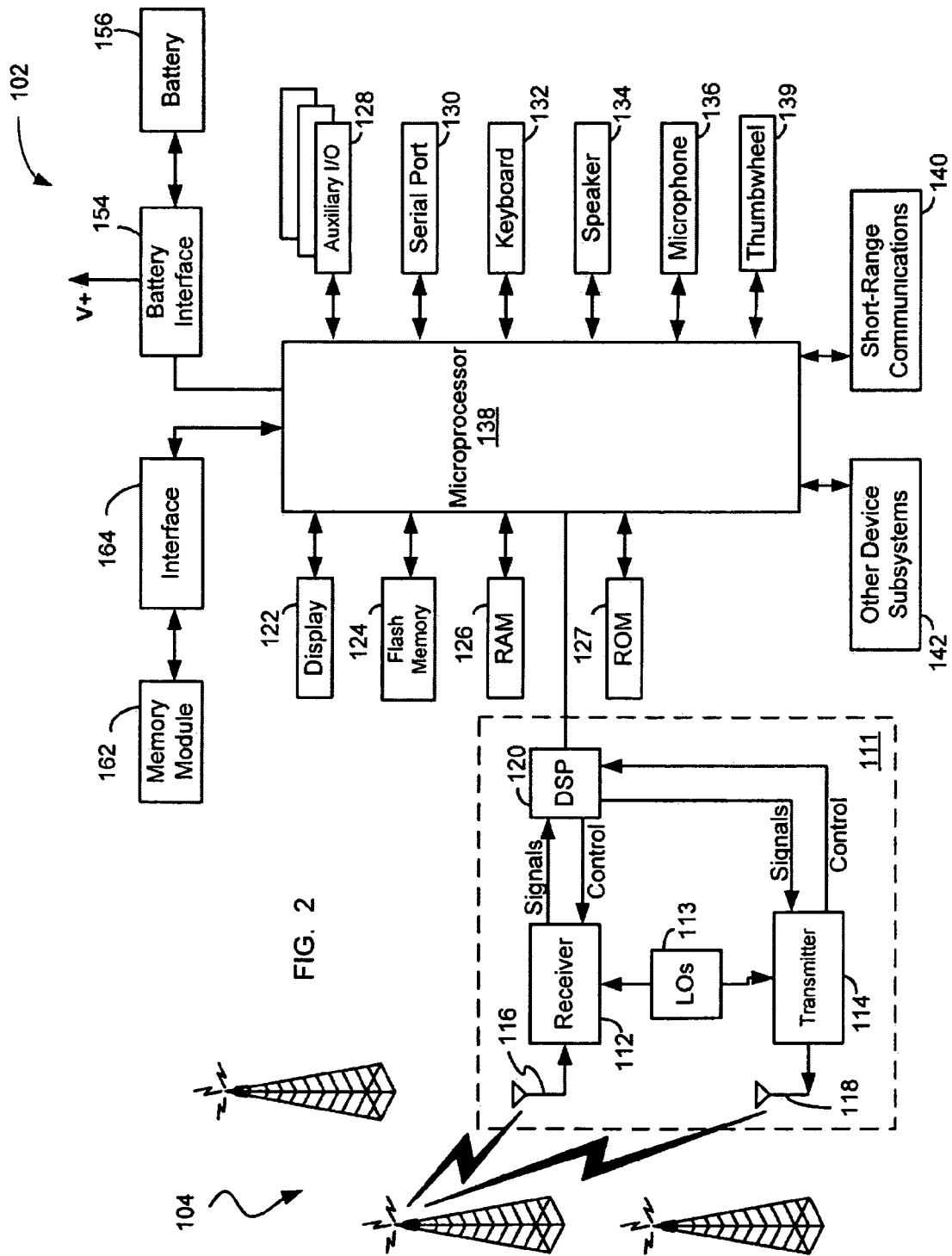
FIG. 2 is a block diagram illustrating a mobile device in accordance with one embodiment of the present application.

FIG. 2 is a block diagram illustrating an exemplary wireless mobile communications device 102 for use with the integrated smart card and battery device 10 in accordance with one embodiment of the present disclosure. The mobile device 102 communicates through a wireless communication network 104. The wireless network 104 includes antenna, base stations, and supporting radio equipment as for supporting wireless communications between the mobile device 102 and other devices connected to wireless network 104. The wireless network 104 may be coupled to a wireless network gateway (not shown) and to a wide area network (not shown).

The mobile device 102 is preferably a two-way communication device having at least voice and advanced data communication capabilities, including the capability to communicate with other computer systems. Typically, the mobile device 102 is a handheld device. Depending on the functionality provided by the mobile device 102, it may be referred to as a data messaging device, a two-way pager, a cellular telephone with data messaging capabilities, a wireless Internet appliance, or a data communication device (with or without telephony capabilities). The mobile device 102 may communicate with any one of plurality of fixed transceiver stations within its geographic coverage area.

The mobile device 102 will normally incorporate a communication subsystem 111, which includes a receiver 112, a transmitter 114, and associated components, such as one or more (preferably embedded or internal) antenna elements 116 and 118, local oscillators (LOs) 113, and a processing module such as a digital signal processor (DSP) 120. As will be apparent to those skilled in field of communications, the particular design of the communication subsystem 111 depends on the wireless network 104 in which mobile device 102 is intended to operate.

The mobile device 102 may send and receive communication signals over the wireless network 104 after the required network registration or activation procedures have been completed. Signals received by the antenna 116 through the wireless network 104 are input to the receiver 112, which may perform such common receiver functions as signal amplification, frequency down conversion, filtering, channel selection, and the like, and analog-to-digital (A/D) conversion. A/D conversion of a received signal allows more complex communication functions such as demodulation and decoding to be performed in the DSP 120. In a similar manner, signals to be transmitted are processed, including modulation and encoding, for example, by DSP 120. These DSP-processed signals are input to the transmitter 114 for digital-to-analog (D/A) conversion, frequency up conversion, filtering, amplification and transmission over the wireless network 104 via the antenna 118. The DSP 120 not only processes communication signals, but also provides for receiver and transmitter control. For example, the gains applied to communication signals in the receiver 112 and the transmitter 114 may be adaptively controlled through automatic gain control algorithms implemented in the DSP 120.

Network access is associated with a subscriber or user of the mobile device 102, and therefore the mobile device 102 requires a memory module 162, such as a Subscriber Identity Module (SIM) card or a Removable User Identity Module (R-UIM), to be inserted in or connected to an interface 164 of the mobile device 102 in order to operate in the wireless network 104. Alternatively, the memory module 162 may be a non-volatile memory which is programmed with configuration data by a service provider so that the mobile device 102 may operate in the wireless network 104. Since, the mobile device 102 is a mobile battery-powered device, it also includes a battery interface 154 for receiving one or more rechargeable batteries 156. The battery 156 provides electrical power to most, if not all, electrical circuitry in the mobile device 102, and the battery interface 154 provides a mechanical and electrical connection for it. The battery interface 154 is coupled to a regulator (not shown) which provides power V+ to the circuitry of the mobile device 102.

The mobile device 102 includes a microprocessor 138 which controls the overall operation of the mobile device 102. Communication functions, including at least data and voice communications, are performed through communication sub-system 111. The microprocessor 138 also interacts with additional device subsystems such as a display 122, a flash memory 124, a random access memory (RAM) 126, a read-only access memory (ROM) 127, auxiliary input/output (I/O) subsystems 128, a data port such as serial-port 130, a keyboard or keypad 132, a speaker 134, a microphone 136, a clickable thumbwheel or trackwheel 139, a short-range communications subsystem 140, and any other device subsystems generally designated at 142. Some of the subsystems shown in FIG. 2 perform communication-related functions, whereas other subsystems may provide "resident" or on-device functions. Notably, some subsystems, such as keypad 132, display 122, and clickable thumbwheel 139, for example, may be used for both communication-related functions, such as entering a text message for transmission over the wireless network 104, and device-resident functions such as a calculator or task list. Operating system software used by the microprocessor 138 is preferably stored in a persistent store such as flash memory 124, which may alternatively be ROM 127 or similar storage element. Those skilled in the art will appreciate that the operating system, specific device applications, or parts thereof, may be temporarily loaded into a volatile store such as RAM 126.

The microprocessor 138, in addition to its operating system functions, preferably enables execution of software applications on the mobile device 102. A predetermined set of applications which control basic device operations, including at least data and voice communication applications, will normally be installed on the mobile device 102 during its manufacture. A preferred application that may be loaded onto mobile device 102 may be a personal information manager (PIM) application having the ability to organize and manage data items relating to user such as, but not limited to, instant messaging, email, calendar events, voice mails, appointments, and task items. Naturally, one or more memory stores are available on the mobile device 102 and the memory module 162 to facilitate storage of PIM data items and other information.

The PIM application preferably has the ability to send and receive data items via the wireless network 104. In one embodiment, PIM data items are seamlessly combined, synchronized, and updated via the wireless network 104, with the mobile device user's corresponding data items stored and/or associated with a host computer system thereby creating a mirrored host computer on the mobile device 102 with respect to such items. This is especially advantageous where the host computer system is the mobile device user's office computer system. Additional applications may also be loaded onto the mobile device 102 through the wireless network 104, the auxiliary I/O subsystem 128, the serial port 130, the short-range communications subsystem 140, or any other suitable subsystem 142, and installed by a user in RAM 126 or preferably a non-volatile store (not shown) for execution by the microprocessor 138. Such flexibility in application installation increases the functionality of the mobile device 102 and may provide enhanced on-device functions, communication-related functions, or both. For example, secure communication applications may enable electronic commerce functions and other such financial transactions to be performed using the mobile device 102.

In a data communication mode, a received signal such as a text message, an email message, or Web page download will be processed by the communication subsystem 111 and input to the microprocessor 138. The microprocessor 138 will preferably further process the signal for output to the display 122 or alternatively to the auxiliary I/O device 128. A user of the mobile device 102 may also compose data items, such as email messages, for example, using the keypad 132 and the clickable thumbwheel 139 in conjunction with the display 122 and possibly the auxiliary I/O device 128. The keypad 132 is preferably a complete alphanumeric keypad and/or telephone-type keypad. These composed items may be transmitted over the wireless network 104 through the communication subsystem 111 or the short range communication subsystem 140.

For voice communications, the overall operation of the mobile device 102 is substantially similar, except that the received signals would be output to the speakers 134 and signals for transmission would be generated by the microphone 136. Alternative voice or audio I/O subsystems, such as a voice message recording, subsystem, may also be implemented on the mobile device 102. Although voice or audio signal output is preferably accomplished primarily through the speaker 134, the display 122 may also be used to provide an indication of the identity of a calling party, duration of a voice call, or other voice call related information.

The serial port 130 is normally implemented in a personal digital assistant (PDA)-type communication device for which synchronization with a user's desktop computer is a desirable, albeit optional, component. The serial port 130 enables a user to set preferences through an external device or software application and extends the capabilities of the mobile device 102 by providing for information or software downloads to the mobile device 102, other than through the wireless network 104. The alternate download path may, for example, be used to load an encryption key onto the mobile device 102, through a direct and thus reliable and trusted connection to thereby provide secure device communication.

The short-range communications subsystem 140 is an additional optional component which provides for communication between the mobile device 102 and different systems or devices, which need not necessarily be similar devices. For example, the subsystem 140 may include an infrared device and associated circuits and components or a Bluetooth™ communication module to provide for communication with similarly-enabled systems and devices (Bluetooth™ is a registered trademark of Bluetooth SIG, Inc.).

Figure 3:
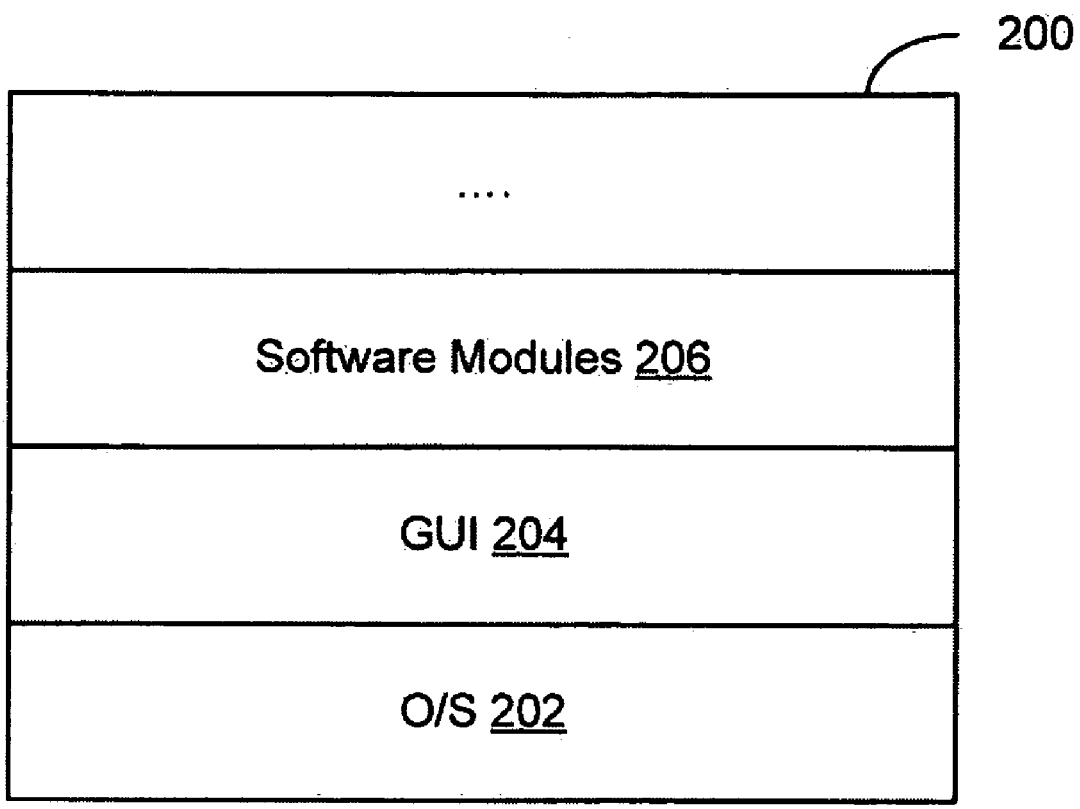
FIG. 3 is a block diagram illustrating a memory of the mobile device of FIG. 2.

FIG. 3 is a block diagram illustrating a memory 200 of the mobile device 102. The memory 200 has various software components for controlling the mobile device 102 and may include, for example, flash memory 124, RAM 126 and/or ROM 127. In accordance with one embodiment, the mobile device 102 is intended to be a multi-tasking wireless communication device configured for sending and receiving data items and for making and receiving voice calls. To provide a user-friendly environment to control the operation of the mobile device 102, an operating system 202 resident on the mobile device 102 provides a basic set of operations for supporting various applications typically operable through a graphical user interface (GUI) 204. For example, the operating system 202 provides basic input/output system features to obtain input from the auxiliary I/O 128, keypad 132, clickable thumbwheel 139, and other input devices, and to facilitate output to the user via the display 122. One or more software modules 206 for managing communications or providing a personal digital assistant (PDA) or other functions may also be included.

Thus, the mobile device 102 includes computer executable programmed instructions for directing the mobile device 102 to implement various applications. The programmed instructions may be embodied in one or more software modules 206 resident in the memory 200 of the mobile device 102. Alternatively, the programmed instructions may be embodied on a computer readable medium (such as a DVD, CD, floppy disk or other storage media) which may be used for transporting the programmed instructions to the memory 200 of the mobile device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 111, 130, 140 to the mobile device 102 from the wireless network 104 by end users.

Figure 4:
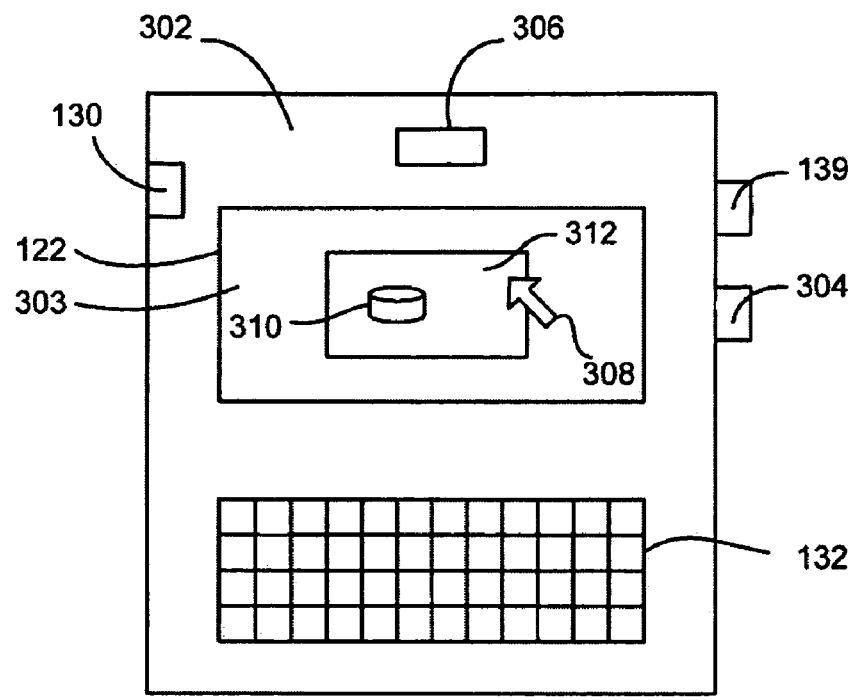
FIG. 4 is a front view illustrating the mobile device of FIG. 2.

FIG. 4 is a front view of the mobile device 102. As mentioned above, the mobile device 102 may be a data and voice-enabled handheld device. The mobile device 102 includes a casing 302, data or serial port 130, display screen 122, graphical user interface (GUI) 303, keypad 132, clickable thumbwheel 139, one or more input buttons 304 (e.g. select, cancel buttons), and signal inputs/outputs 306 (e.g., power connector input, microphone, speaker, data interface input, etc.). Internally, the mobile device 102 includes one or more circuit boards a microprocessor 138, a memory 200, a battery 156, an antenna 116, 118, etc., which are coupled to the signal inputs/outputs 306, keypad 132, display screen 122, clickable thumbwheel 139, etc.

The microprocessor 138 is typically coupled to one or more input devices (e.g. buttons 304, keypad 132, clickable thumbwheel 139) for receiving user commands or queries, and the display 122 for displaying the results of these commands or queries. For example, user queries may be, transformed into a combination of commands for Producing one or more tables of output data which may be incorporated in one or more display pages for presentation to the user. The microprocessor 138 is also coupled to the memory 200 containing the software modules 206 and data such as database tables.

A user may interact with the mobile-device 102 and its software modules 206 using the GUI 303. The GUI 303 is supported by the operating system 202 and provides a display format enabling the user to choose commands, execute application programs, manage computer files, and perform other functions by selecting pictorial representations known as icons, or selecting items from a menu through the use of an input or pointing device such as a clickable thumbwheel 139 and/or keypad 132. Generally, the GUI 303 is used to convey information and receive commands from users, and generally includes a variety of GUI objects or controls including icons, toolbars, drop-down menus, pop-up menus, text, dialog boxes, buttons, and the like. A user typically interacts with the GUI 303 presented on the display 122 by using the input or pointing device to position a pointer or cursor 308 over an object 310 (i.e., "pointing" at the object) and by "clicking" on the object 310. (e.g., by depressing the thumbwheel 139 or a button on the keyboard 132, etc.). This is often referred to as a point-and-click operation or a selection operation. Typically the object 310 may be highlighted (e.g., shaded) when it is selected or pointed at by the pointer or cursor 308.

Typically, a GUI-based system presents application, status, and other information to the user in windows appearing on the display 122. A window 312 is a display area within the display 122, typically rectangular, in which a user may view an application or document. A window 312 may be open, closed, displayed full screen, reduced to an icon, increased or reduced in size, or moved to different areas of the display 122. Multiple windows 312 may be displayed simultaneously. For example, windows 312 may be displayed within other windows, overlapped other windows, or tiled within the display area.

Figure 5:
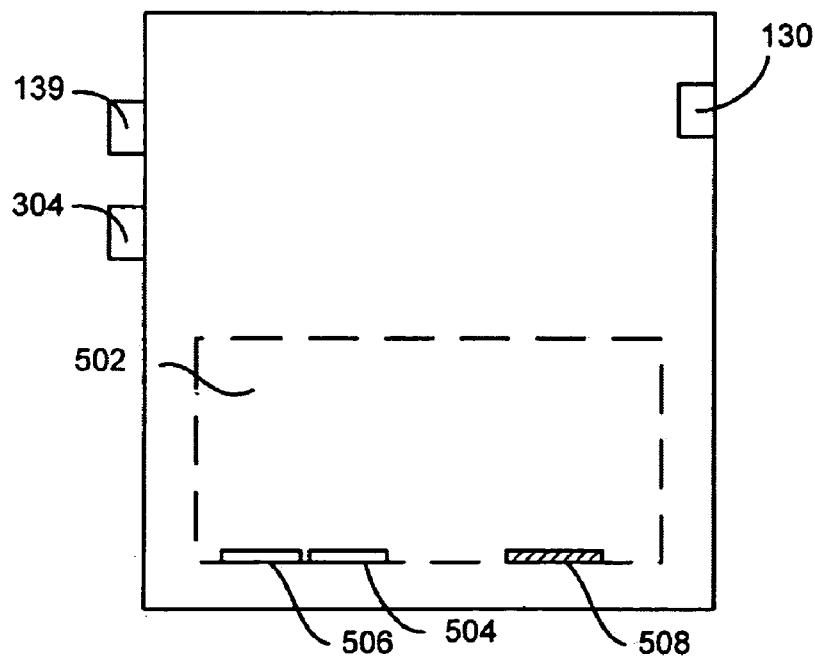
FIG. 5 is a rear view illustrating the mobile device of FIG. 2.

FIG. 5 is a rear view illustrating the mobile device 102. The mobile device 102 is adapted for use with the integrated smart card and battery device 10. The mobile device 102 includes a compartment 502 for receiving the integrated smarts card and battery device 10. The compartment 502 is typically concealed and protected by a removable rear casing or casing portion (not shown). A portion of the battery housing 14 may form the removable rear casing or a portion of it. Alternatively, the battery 12 may be entirely separate from the removable rear casing.

The compartment 502 includes a battery interface or contacts 504 on one side of the compartment 502, and a smart card interface 506 on one side of the compartment 502. The battery interface 504 and smart card interface 506 are operatively connected to the printed circuit board (PCB) of the mobile device 102 (not shown). The smart card interface 34 and battery interface 18 may be on the same side or different sides of the compartment 502, depending on whether the smart card interface 34 and battery interface 18 of the integrated smart card and battery device 10 are provided on the same side of the battery housing 14.

In the embodiment shown in FIG. 5, the battery interface 504 is positioned along the bottom of the compartment 502 and the smart card interface 506 positioned adjacent to or beside the battery interface 504. The battery interface 504 and smart card interface 506 may be provided in a common, combined or integrated interface or connector 508 that integrates the battery interface 504 and the smart card interface 506 such that, when the integrated smart card and battery device 10 is inserted into the mobile devices 102, power and data signals are transmitted from the battery 12 and smart card 32, respectively, to the printed circuit board of the mobile device 102. Data may also be transferred from the mobile device 102 to the smart card 32 via the smart card interfaces 34, 506 or integrated interfaces 36, 508, as the case may be.

The smart card 32 may be adapted to configure the communications subsystem 111 of the mobile device 102 for communication within the wireless communication network 104. Preferably, the smart card 32 comprises a Subscriber Identity Module (SIM), a Removable User Identity Module (UIM) or a Universal Subscriber Identity Module (USIM) configuring the communications subsystem 111 for communication within the wireless communication network 104.

The battery interfaces 18, 504 and smart card interfaces 34, 506 correspond in type or are compatible with each other such that power from the battery 12 is delivered to the mobile device 102, and data may be transmitted between the smart card 32 and the mobile device 102. Additionally, the respective battery interfaces 18, 504 and smart card interfaces 34, 506 are positioned for alignment and interconnection when the integrated smart card and battery device 10 is inserted into the mobile device 102. In this way, the respective battery and smart card interfaces will line-up for connection when the integrated smart card and battery device 10 is installed or inserted in the mobile device 102. Where integrated connectors 36, 508 are used, the integrated connectors 36, 508 are positioned for alignment and interconnection when the integrated smart card and battery device 10 is inserted into the mobile device 102.

As will be appreciated by persons ordinarily skilled in the art, the integrated smart card and battery device of the present application integrates a smart card (e.g. SIM, RUIM or USIM) into the battery such that the smart card and its interface occupy less space, or possibly no space, on the PCB of the mobile device with which it is used. Advantageously, this allows the space formerly occupied by the smart card to be used for other components of the mobile device or to further reduce the PCB and/or mobile device size. Additionally, this may allow only one side of the PCB to be used, reducing manufacturing costs and allowing the mobile device to be thinner than may be otherwise possible. Providing the battery and smart card interface on the same side of the battery (and the battery/smart card compartment) may provide further race savings, and integrating battery and smart card interface in a common data and power connector may provide yet further space savings. Other advantages of the integrated smart card and battery device and mobile will be apparent to persons ordinarily skilled in the art upon a review of the foregoing description of embodiments of the application.

While this application is primarily discussed in connection with an exemplary wireless mobile communications, device to persons ordinarily skilled in the art will understand that the integrated smart card and battery device described above may be adapted for use in any type of mobile electronic or computing device, e.g. digital cameras, portable computers, mobile data messaging (e.g. email) and communication devices, two-way pagers, cellular telephones, personal data assistants (PDAs), wireless handhelds, wireless Internet appliances and other mobile devices. Additionally, the integrated smart card and battery device may be adapted for any type of smart card and/or battery suitable for a mobile device.

The embodiments of the application described above are intended to be examples only. Those of skill in the art may effect alterations, modifications and variations to the particular embodiments without departing from scope of the application. The subject matter described herein in the recited claims intends to cover and embrace all suitable changes in technology.

The invention claimed is:

1. An electronic device for a mobile device, comprising:
    a battery including:
        a housing having a top surface, a bottom surface, and two or more peripheral side surfaces;
        one or more battery cells within the housing;
        a battery interface positioned on a peripheral side surface of the housing;
        a smart card receiving recess defined in the housing for receiving a smart card; and
        a smart card interface positioned on a peripheral side surface of the housing.

2. The electronic device of claim 1, wherein the smart card interface and the battery interface are positioned on a same peripheral side surface of the housing.

3. The electronic device of claim 1, wherein the smart card interface and battery interface are provided in a common data and power connector for providing power and transmitting data between the smart card and the mobile device.

4. The electronic device of claim 1, wherein the smart card recess is defined in the top or bottom of the battery housing.

5. The electronic device of claim 4, wherein the smart card recess is provided with a smart card holder for releasably engaging the smart card.

6. The electronic device of claim 5, wherein the smart card holder comprises a press or snap fit connection for releasably engaging the smart card.

7. The electronic device of claim 1, wherein the smart card configures the mobile device for wireless communications.

8. The electronic device of claim 1, wherein the smart card comprises a Subscriber Identity Module (SIM), a Removable User Identity Module (RUIM) or a Universal Subscriber Identity Module (USIM).

9. A mobile device, comprising:
    a processor for processing data and instructions;
    input and output devices operable by a user of the mobile device and operatively connected to the processor; and
    a casing having the processor and input and output devices received therein, the casing defining a compartment having at least two peripheral side surfaces, the compartment having a circuit board operatively connected to the processor and input and output devices received therein and including:
        a compartment battery interface operatively connected to the circuit board positioned within the compartment for receiving power from a battery to be received within the compartment, the battery interface being positioned on a peripheral side surface of the compartment; and
        a compartment smart card interface operatively connected to the circuit board positioned within the compartment for communication with a smart card to be received within the compartment, the smart card interface being positioned on a peripheral side surface of the compartment.

10. The mobile device of claim 9, wherein the compartment smart card interface and the compartment battery interface are positioned on a same peripheral side surface of the compartment.

11. The mobile device of claim 9, further comprising:
    an electronic device received in the compartment, the electronic device comprising:
        a battery including:

a housing having a top surface, a bottom surface, and two or more peripheral side surfaces;

one or more battery cells within the housing;

a housing battery interface positioned on a peripheral side surface of the housing;

a smart card recess defined in the housing for receiving a smart card; and a housing smart card interface positioned on a peripheral side surface of the housing.

12. The mobile device of claim 11, wherein the respective battery interfaces and respective smart card interfaces of the housing and compartment are positioned on a corresponding peripheral side surface of the housing and compartment, respectively, for providing power and transmitting data between the electronic device and the mobile device.

13. The mobile device of claim 11, wherein the respective battery interfaces and respective smart card interfaces of the housing and compartment are provided in a common data and power connector, respectively.

14. The mobile device of claim 11, wherein the smart recess is defined in the top or bottom of the battery housing.

15. The mobile device of claim 11, further comprising a communications subsystem, the smart card being adapted to configure the communications subsystem for communication within a wireless communication network.

16. The mobile device of claim 11, further comprising a communication subsystem, the smart card comprising a Subscriber Identity Module (SIM), a Removable User Identity Module (RUIM) or a Universal Subscriber Identity Module (USIM) configuring the communications subsystem for communication within a wireless communication network.

17. The mobile device of claim 11, wherein the smart card recess is provided with a smart card holder for releasably engaging the smart card.

18. The mobile device of claim 17, wherein the smart card holder comprises a press or snap fit connection for releasably engaging the smart card.

19. The mobile device of claim 11, wherein the housing smart card interface and the housing battery interface are positioned on a same peripheral side surface of the housing.

20. The mobile device of claim 9, wherein the compartment smart card interface and the compartment battery interface are provided in a common data and power connector for providing power and transmitting data between the smart card and the mobile device.

* * * * *